United States Patent [19]

Hoshino et al.

[11] Patent Number: 5,025,855
[45] Date of Patent: * Jun. 25, 1991

[54] CONDENSER FOR USE IN A CAR COOLING SYSTEM

[75] Inventors: Ryoichi Hoshino; Hironaka Sasaki; Takayuki Yasutake, all of Oyamashi, Japan

[73] Assignee: Showa Aluminum Kabushiki Kaisha, Osaka, Japan

[*] Notice: The portion of the term of this patent subsequent to May 2, 2006 has been disclaimed.

[21] Appl. No.: 509,901

[22] Filed: Apr. 16, 1990

Related U.S. Application Data

[62] Division of Ser. No. 328,896, Mar. 27, 1989, Pat. No. 4,936,379, which is a division of Ser. No. 77,815, Jul. 27, 1987, Pat. No. 4,825,941.

[30] Foreign Application Priority Data

Jul. 29, 1986 [JP] Japan .................... 61-179763
Nov. 2, 1986 [JP] Japan .................... 61-263138

[51] Int. Cl.$^5$ ............................. F28D 1/00
[52] U.S. Cl. .................... 165/150; 165/110; 165/153; 165/174
[58] Field of Search ............ 165/110, 133, 150, 153, 165/174, 175, 176

[56] References Cited

U.S. PATENT DOCUMENTS

| 2,004,390 | 6/1935 | Benzinger | 165/176 X |
| 2,573,161 | 10/1951 | Tadewald | 165/153 |
| 4,202,407 | 5/1980 | Woitowitz | 165/76 |
| 4,569,390 | 2/1986 | Knowlton et al. | 165/149 |
| 4,615,952 | 10/1986 | Knoll | 428/650 |
| 4,825,941 | 5/1989 | Hoshino et al. | 165/110 |

Primary Examiner—Allen J. Flanigan

[57] ABSTRACT

A condenser apparatus includes a pair of headers provided in parallel with each other; a plurality of tubular elements whose opposite ends are connected to the headers; and fins provided in the air paths between one tube and the next. Each of the headers is made of a cylindrical pipe of aluminum. At least one of the headers is internally divided by a partition into at least two groups of coolant passageways, thus enabling the flow of coolant to make at least one U-turn in the header. The partition extends into the header through a slit in the header. Each of the tubular elements is made of a flat hollow tube of aluminum. The opposite ends of the tubular elements are inserted into slits produced in the headers so that they are liquid-tightly secured.

1 Claim, 6 Drawing Sheets

CONDENSER FOR USE IN A CAR COOLING SYSTEM

This is a division of application Ser. No. 328,896, filed Mar. 27, 1989, now U.S. Pat. No. 4,936,379, the text of which is hereby incorporated by reference, which is a division of Ser. No. 077,815, filed Jul. 27, 1987 now U.S. Pat. No. 4,825,941.

BACKGROUND OF THE INVENTION

1. Field of the Invention

The present invention relates to a condenser for use as a cooler in automobiles, and more particularly to a condenser for such use, which is made of aluminum. Herein "aluminum" includes aluminum alloys.

2. Description of the Prior Art

In general heat exchangers as car coolers use a high pressure gaseous coolant, and they must have an anti-pressure construction.

To this end the known heat exchangers are provided with a core which includes flat tubes arranged in zigzag forms, each tube having pores, and fins interposed between one tube and the next. Hereinafter this type of heat exchanges will be referred to as a serpentine type heat exchanger.

The serpentine type heat exchangers are disadvantageous in that the coolant undergoes a relatively large resistance while flowing throughout the tubes. To reduce the resistance the common practice is to use wider tubes so as to increase the cross-sectional area thereof. However this leads to a large core, and on the other hand an accommodation space in the automobile is very much limited. As a result this practice is not always effective.

Another practice is to place more fins in the space between the tubes. This requires that the height of each fin is reduced. However, when the fins are too small the bending work becomes difficult, and takes more time and labor.

In general the condenser has a coolant path which consists of two sections, that is, an inlet section, hereinafter referred to as "condensing section" in which the coolant is still gaseous, and an outlet section, hereinafter referred to as "supercooling section" in which it becomes liquid. In order to increase the heat exchange efficiency it is essential to increase the area for effecting heat transfer in the condensing section, whereas it is no problem for the supercooling section to have a reduced area for heat transfer.

The conventional serpentine type heat exchangers have a coolant passageway which consists of a single tube. If the tube is to have a wider cross-sectional section the tube per se must be large throughout the entire length; in other words a large tube must be used. This of course leads to a larger condenser.

As is evident from the foregoing description it is difficult to improve the conventional serpentine type heat exchangers merely by changing the dimensional factors thereof.

Basically the serpentine type heat exchangers involve the complicated process which consists of bending tubes, and then assembling them into a core in combination with fins. This is why it is difficult to produce the heat exchangers on automatic mass production line. Non-automatic production is costly.

OBJECTS AND SUMMARY OF THE INVENTION

The present invention aims at solving the difficulties pointed out with respect to the conventional serpentine type heat exchangers, and has for its object to provide a condenser having a relatively small core which nevertheless includes a large effective cross-sectional area for coolant passageways, thereby reducing a possible resistance to the flow of coolant.

Another object of the present invention is to provide a condenser having coolant passageways which are divided into a condensing section and a supercooling section which are different in the numbers of tubes from each other.

A further object of the present invention is to provide a condenser having a core whose construction is adapted for enhancing the heat exchange efficiency.

Other objects and advantages of the present invention will become more apparent from the following detailed description, when taken in conjunction with the accompanying drawings which show, for the purpose of illustration only, one embodiment in accordance with the present invention.

According to the present invention there is provided a condenser adapted for use in the car cooling system, the condenser comprising:

a pair of headers provided in parallel with each other;

a plurality of tubular elements whose opposite ends are connected to the headers;

fins provided in the air paths between one tube and the next;

wherein each of the headers is made of a cylindrical pipe of aluminum;

wherein each of the tubular elements is made of a flat hollow tube of aluminum by extrusion; and wherein the opposite ends of the tubular elements are inserted into slits produced in the headers so that they are liquid-tightly soldered therein.

As is evident from the summary of the invention, the present invention adopts a multi-flow pattern system, whereby the coolant flows through a plurality of tubular elements at one time. The effective cross-sectional area for coolant passageways can be increased merely by increasing the number of tubular elements, thereby reducing resistance acting on the coolant. This leads to the reduction in the pressure loss of coolant.

In general, the multi-flow pattern system is unable to withstand a high pressure provided by a pressurized gaseous coolant because of the relatively fragile joints between the headers and tubular elements, and the headers per se which are constructed without presupposing the high pressure which would act thereon by the coolant. In order to solve this problem encountered by the multi-flow pattern system the condenser of the present invention uses a cylindrical pipe for the header, and flat tubes for the tubular elements, whose opposite ends are inserted in the slits produced in the headers and soldered therein, thereby ensuring that the condenser withstands a high pressure provided by the coolant.

Each of the headers is internally divided by a partition into a least two sections; that is, a condensing section and a supercooling section, wherein the condensing section has a coolant in its gaseous state whereas the supercooling section has a coolant in its liquid state. When the coolant is in a gaseous state its volume is large, which requires a relatively large effective cross-sectional area for the coolant passageways. When it is in a liquid state the volume reduces, thereby allowing the coolant passageway to have a relatively small cross-sectional area.

According to the present invention there are provided dimensional relationships among the width, height and pitch of the tubular elements and fins as follows:

Width of the tubular element: 6 to 12 mm
Height of the tubular element: 5 mm or less
Height of each fin: 8 to 16 mm
Fin Pitch: 1.6 to 3.2 mm The tubular elements are jointed to the headers; more specifically, the opposite ends of each tubular element are inserted into slits produced in the headers so that they fit therein in a liquid-tight manner and then they are soldered therein. Prior to the insertion the tubular elements or the headers or both are provided with a layer of a soldering substance. All the soldering is effected at one time by placing the assembled unit in a furnace, thereby saving time and labor in the assembling work.

DETAILED DESCRIPTION OF THE PREFERRED EMBODIMENT

Figure 1:
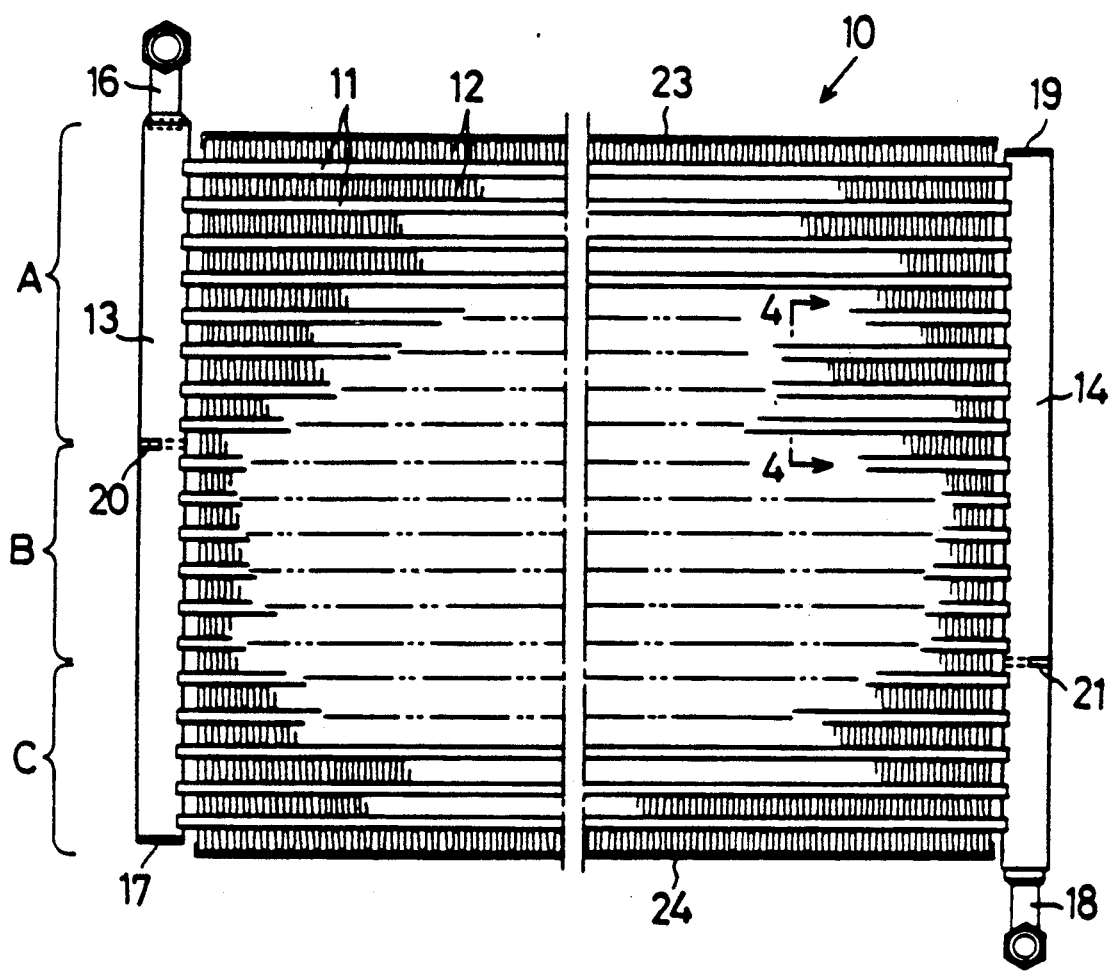
FIG. 1 is a front view showing a condenser embodying the present invention.
Figure 2:
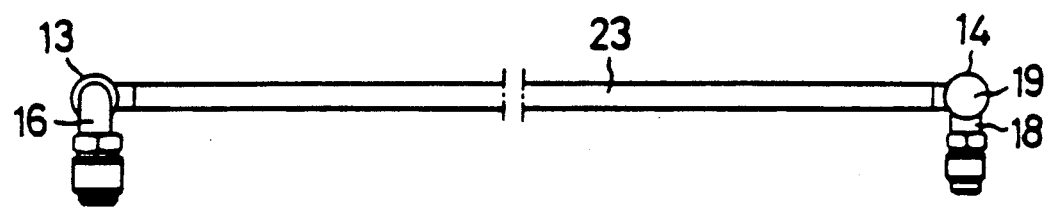
FIG. 2 is a plan view showing the condenser of FIG. 1.

As shown in FIG. 1 the condenser 10 of the present invention includes a plurality of planar tubes 11, and corrugated fins 12 alternately arranged. The tubes 11 are connected to headers 13 and 14 at their opposite ends.

The tube 11 is planar, made of aluminum; preferably, of a multi-hollow type.

The header 13, 14 is made of a cylindrical pipe of aluminum. It is provided with slits 15 produced at equal intervals along its length, where the ends of the tubes 11 are soldered to the respective headers 13, 14. The left-hand header 13 is provided with a coolant inlet pipe 16 at its upper end and plug 17 at the lower end. The right-hand header 14 is provided with a coolant outlet pipe 18 at its lower end and a plug 19 at its upper end. The coolant inlet and outlet are diametrically located. The reference numerals 23 and 24 denote side plates fixed to the fins 12 located at the outermost positions.

Each header 13, 14 is provided with a partition 20, 21, respectively, thereby dividing the internal chamber into upper and lower sections, wherein the partition 20 in the header 13 is located slightly toward the inlet 16, whereas the partition 21 in the header 14 is located about ⅓ the length toward the outlet 18.

Figure 8:
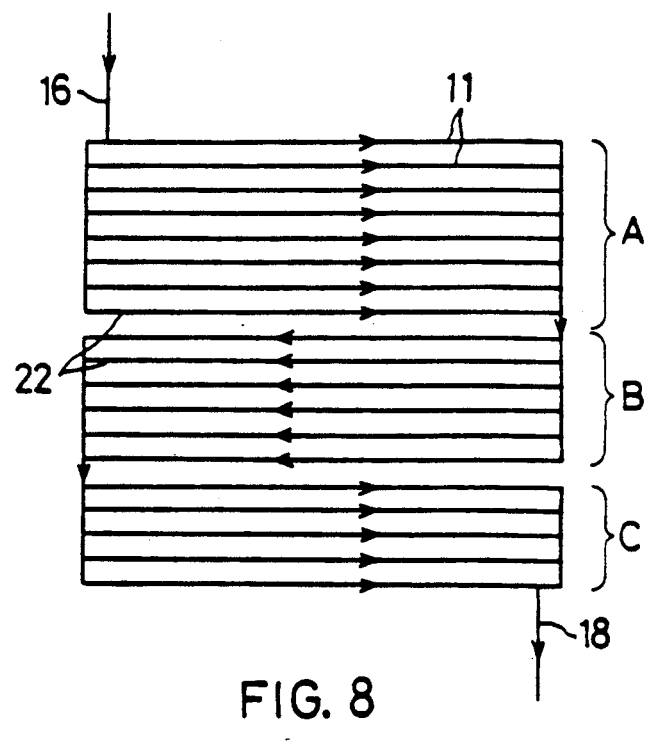
FIG. 8 is an explanatory view showing a flow pattern of coolant.

Because of the provision of the partitions 20 and 21 in the headers 13 and 14 the flow pattern of the coolant is formed as shown in FIG. 8; that is, the coolant passageway is grouped into an inlet section (A), a middle section (B) and an outlet section (C). As seen from FIG. 8 the coolant flows in three different directions. In addition, the tubes are different in number from group to group; that is, the group (B) has more tubes than the group (C) (outlet section), and the group (A) (inlet section) has more tubes than the group (B). This means that the group (A) has a larger effective cross-sectional area for coolant passageway than the group (B), which in turn has a greater area for it than the group (C).

Referring to FIG. 8 the coolant introduced into the core through the inlet pipe 16 flows to the right-hand header 14 in the inlet section (A), and then in a reversed direction in the middle section (B). In the outlet section (C) the flow of coolant is again reversed, and led to the right-hand header 14, where it is discharged through the outlet pipe 18. While the coolant is flowing through the sections (A), (B) and (C) heat exchange takes place between the coolant and the air passing through the fins 12. In the inlet section (A) the coolant is in its gaseous state, but because of the large effective cross-sectional area in the section (A) heat exchange proceeds efficiently between the coolant and the air. In the section (C) the coolant is in its liquid state, and reduced in its volume, which allows the section (C) to have a relatively small cross-sectional area for coolant passageway as compared with the section (B). In this way the coolant passes through the first condensing section (A), the second section (B) and the third supercooling section (C), in the course of which heat exchange smoothly and efficiently takes place.

In the illustrated embodiment the numbers of tubes are progressively decreased from the section (A) to the section (B) and to the section (C). However it is possible to give the same number of tubes to the sections (A) and (B), and a smaller number of tubes to the section (C). Alternatively it is possible to arrange so that each section (A) to (C) has the same number of tubes but their cross-sectional areas are progressively reduced from the section (A) to the section (B) and to the section (C). As a further modification the intermediate section (B) can be omitted; in this case the flow pattern is called a two-path system. In contrast, the above-mentioned embodiment is called a three-path system. As a still further modification one or more intermediate sections can be added.

The illustrated embodiment has the headers located at the left-hand side and the right-hand side but they can be located at the upper side and the lower side wherein and tubes and fins are vertically arranged.

Figure 3:
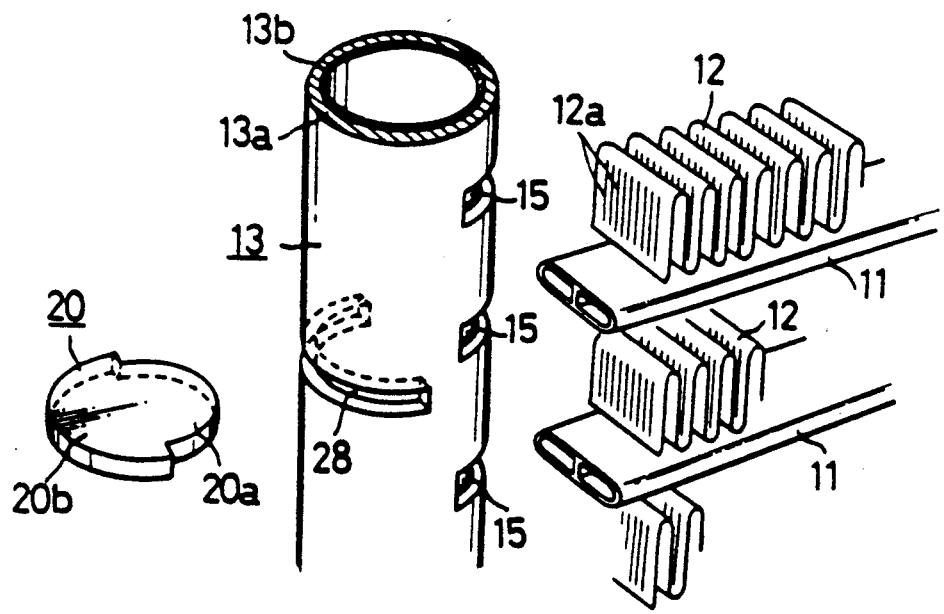
FIG. 3 is a perspective view showing the joint between the header and the individual tubes.
Figure 4:
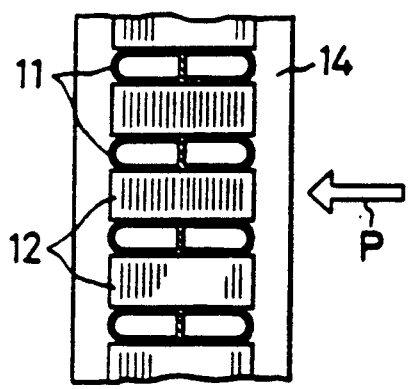
FIG. 4 is a cross-sectional view through the line 4—4 in FIG. 1.
Figure 5:
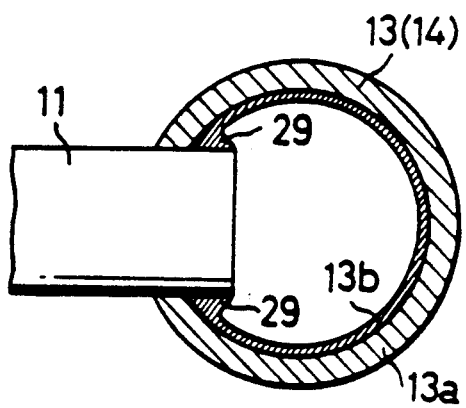
FIG. 5 is a cross-sectional view showing the joint between the header and the tube.
Figure 6:
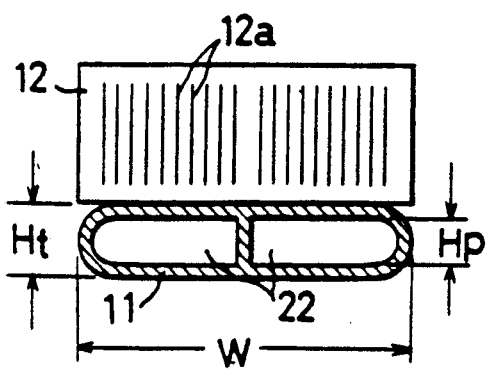
FIG. 6 is a cross-sectional view of the tube exemplifying a dimensional relationship about it.

To join the tubes 11 to the headers 13, 14 the tubes or the headers or both are previously provided with a layer of a soldering substance on their ajoining surfaces. More specifically, as shown in FIG. 3 there is a an aluminum pipe 13a, such as a clad metal pipe, which is used as the headers 13 and 14. The clad pipe 13a has a layer of a soldering substance 13b. The pipe 13b is electrically seamed but can be made by extrusion or any other known method. For the soldering substance an Al.Si alloy preferably containing 6 to 13% by weight of Si is used. The tubes 11 are inserted in the slits 15 for their end portions to be held therein. Then they are heated together to melt the soldering substance. In this case, as clearly shown in FIG. 5 the adjoining parts of the tube 11 and the clad pipe 13a have fillets 29, whereby the header 13, 14 and the tubes 11 are jointed to each other without gaps interposed therebetween. Likewise, the corrugated fins 12 can be provided with a layer of a soldering substance, thereby effecting the soldering joint between the fins 12 and the tubes 11 simultaneously when the tubes 11 are jointed to the headers 13, 14. This facilitates the soldering joint among the headers 13, 14, the tubes 11 and the fins 12, thereby saving labor and time in the assembling work. The layer of a soldering substance can be provided in the inner surface of the clad pipe 13a.

The partitions 20, 21 are jointed to the respective headers 13, 14 in the following manner;

The clab pipe 13a is previously provided with a semicircular slit 28 in its wall, wherein the slit 28 covers half the circumference of the pipe 13a. The partition 20, 21 is made of a disc-shaped plate having a smaller circular portion 20a and a larger circular portion 20b, wherein the smaller circular portion 20a has a diameter equal to the inside diameter of the pipe 13a, and wherein the larger circular portion 20b has a diameter equal to the outside diameter of the pipe 13a. The larger diameter portion 20b is inserted and soldered in the slit 28. The headers 13, 14 and the partitions 20, 21 are preferably provided with layers of soldering substances as described above, so that the soldering joint between them can be performed simultaneously when the tubes 11 are soldered to the headers 13, 14. This finishes the soldering joint among the headers, the tubes, the fins and the partitions at one time. The larger diameter portion 20b fits in the slit 28 so that no leakage of coolant is likely to occur, and that the appearance of an outer surface of the pipe 13a is maintained. In addition, the larger diameter portion 20b is embedded in the slit 28, thereby preventing the partition 20, 21 from being displayed by an unexpected force acting thereon.

Figure 7:
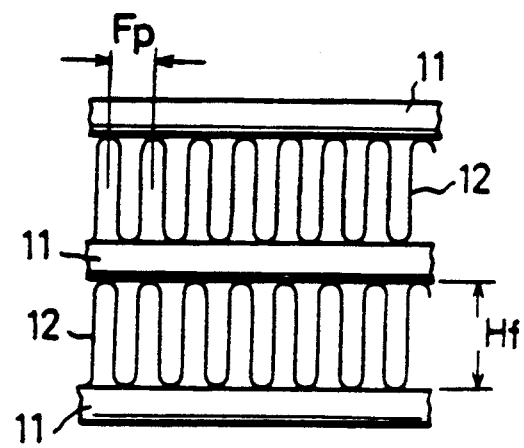
FIG. 7 is a schematic view of the fin exemplifying a dimensional relationship about it.
Figure 15:
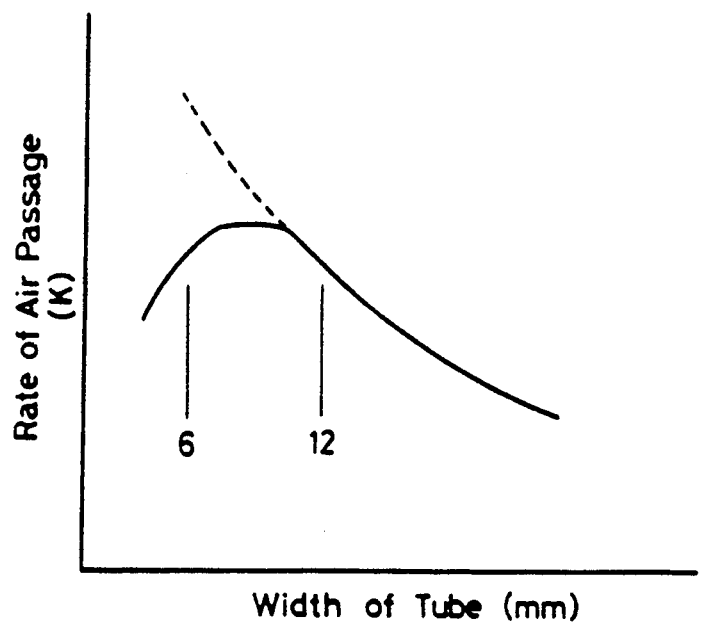
FIG. 15 is a graph showing the relationship between the width of the tubes and the rate of air passage therethrough.
Figure 16:
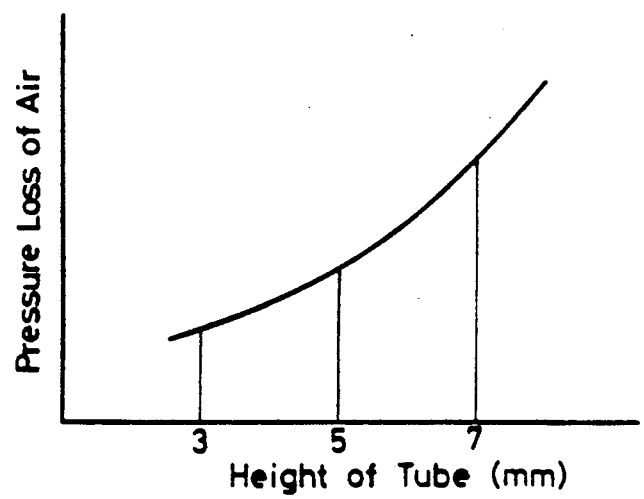
FIG. 16 is a graph showing the relationship between the height of the tubes and the pressure loss of air.
Figure 17:
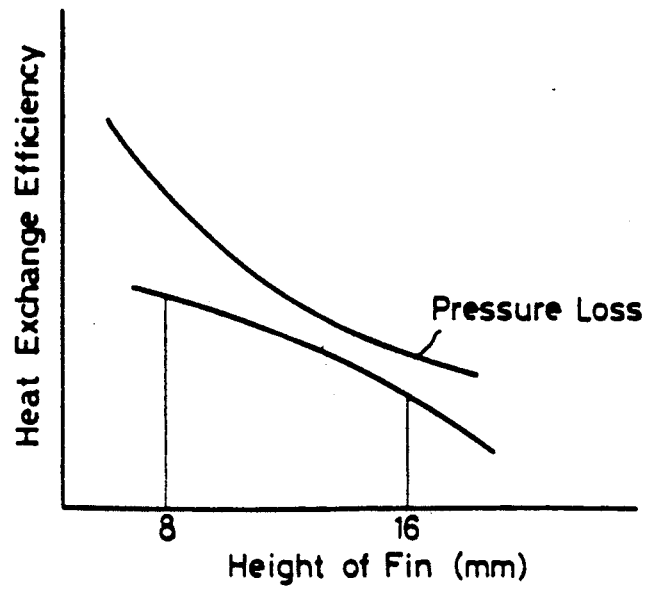
FIG. 17 is a graph showing variations in the heat exchange efficiency with respect to the height of the fins and the pressure loss of air.

As is generally known in the art, the pressure drop for air largely depends on the relative positional relationship between the tubes 11 and the fins 12. A reduced pressure loss leads to the increased heat exchange efficiency. Accordingly, the heat exchange efficiency depends on this positional relationship between them. Now, referring to FIGS. 7 and 8 this positional relationship will be described:

It is prescribed so that the tube 11 has a width (W) of 6 to 12 mm, and a height (Ht) of not smaller than 5 mm, and that the fin 12 has a height (Hf) of 8 to 16 mm, and a fin pitch (Fp) of 1.6 to 3.2 mm. Referring to FIGS. 15, 16 and 17 the reasons for the prescriptions are as follows:

As shown in FIG. 15, if the tube 11 has a width of smaller than 6 mm the fin 12 will be accordingly narrower, thereby reducing the number of louvers 12a. The reduced number of louvers 12a leads to less efficient heat exchange. It the tube is wide enough to allow an adequate number of louvers 12a to be provided on the fins 12, the heat exchange efficiency will be enhanced. However if the width (W) of the tube is more than 12 mm, the fins 12 will be accordingly widened, thereby increasing its weight. In addition too wide fins and too many louvers are likely to increase resistance to the air passing therethrough, thereby causing a greater pressure loss of air.

If the fins 12 have a height (Hf) of more than 5 mm the pressure loss of air will increase. The inside height (Hp) of the tube 11 is preferably not smaller than 8 mm. The inside height (Hp) is important in that it defines the size of an effective coolant passageway. If it is smaller than 8 mm the pressure drop of coolant will increase, thereby reducing the heat exchange efficiency. In order to maintain a height (Hp) of at least 0.8 mm for coolant passageway, the height (Ht) of the tube 11 will have to be at least 2.5 mm inclusive of the thickness of the tube wall.

As shown in FIG. 17, if the height (Hf) of the fin 12 is not larger than 8 mm the pressure drop of air will increase, but if it is larger than 16 mm the number of fins will have to be reduced, thereby reducing the heat exchange efficiency.

If the pitch (Fp) of fins 14 is smaller than 1.6 mm there will occur an interference between the adjacent louvers 12a, thereby amplifying the pressure loss of air. However if it exceeds 3.2 mm the heat exchange efficiency will decrease.

Figure 9:
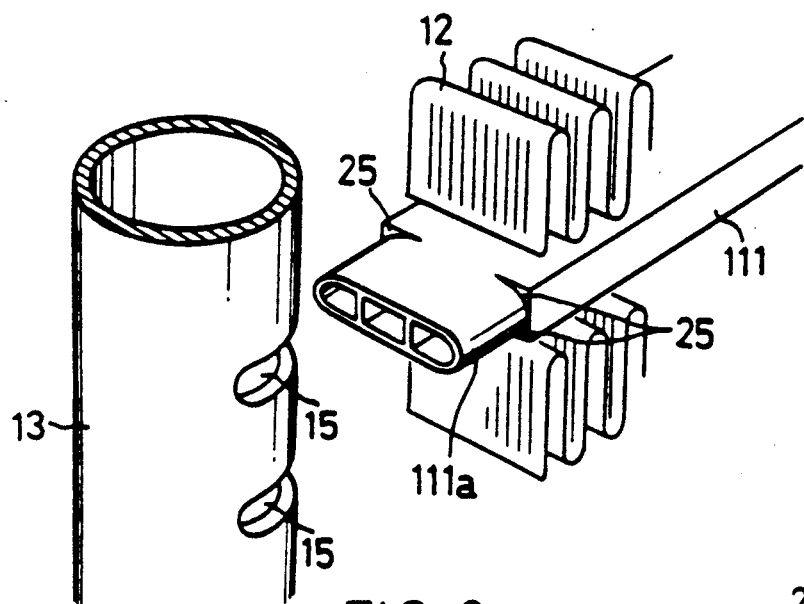
FIG. 9 is a perspective view showing a modified version of the joint between the tubes and the header.
Figure 10:
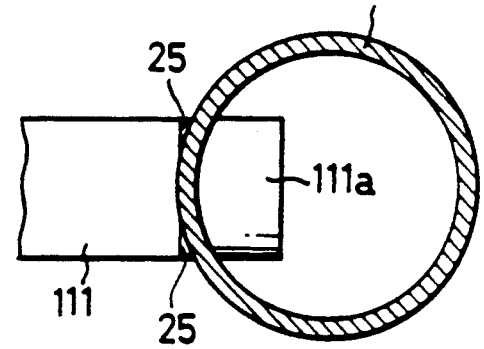
FIG. 10 is a cross-sectional view showing the relationship between the tube and the header after they are jointed to each other.

Referring to FIGS. 9 and 10 a modified version will be described:

This embodiment is characteristic in that it is provided with shoulders 25 which work as stop means to prevent the tube from being inserted too deeply into the header 13, 14. More specifically, the tube 11 includes a body 111 and a head 111a which has shoulders 25 therebetween. The shoulders 25 are adapted to come into abutment with the heater 13, 14 when the tube 11 is inserted into the slit 15.

Figure 11A:
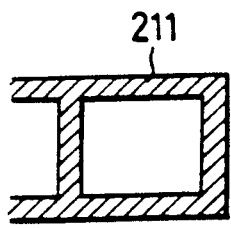
FIGS. 11A–11C are cross-sectional views showing a modified version of the stopper produced in the tube.
Figure 11B:
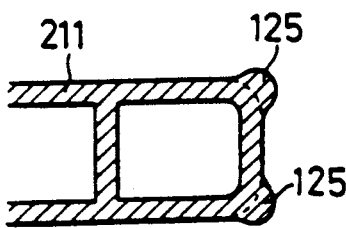
Figure 11C:
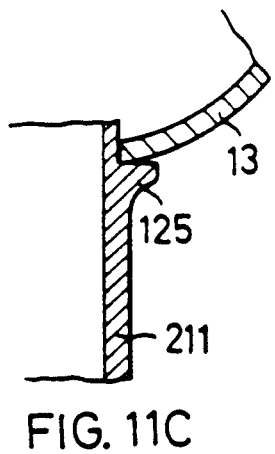
Figure 12A:
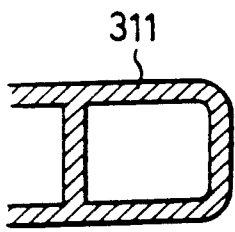
FIGS. 12A–12C are cross-sectional views showing another modified version of the stopper.
Figure 12B:
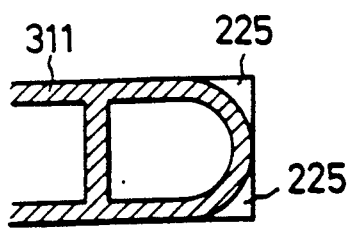
Figure 12C:
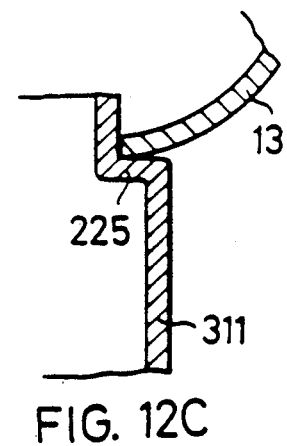
Figure 13A:
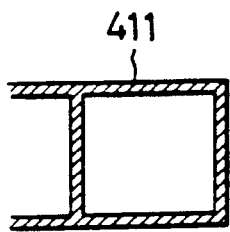
FIGS. 13A–13C are cross-sectional views showing a further modified version of the stopper.
Figure 13B:
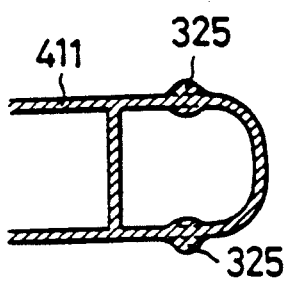
Figure 13C:
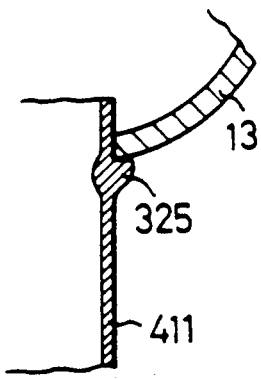

As modified versions of the stop means various examples are shown in FIGS. 11 to 13:

FIG. 11 shows the process of forming stop means 125. In (a) the tube 211 has sharp or acute corners. The corners are cut away in such a manner as to form bulged portions 125, which provide stop means. FIG. 12 shows a tube 311 having round corners, which are split lengthwise in such a manner as to form shoulders 225. FIG. 13 shows a tube 411 having a relatively thin wall. In this case the cutting and splitting are jointly used in such a manner as to form shoulders 325.

Figure 14:
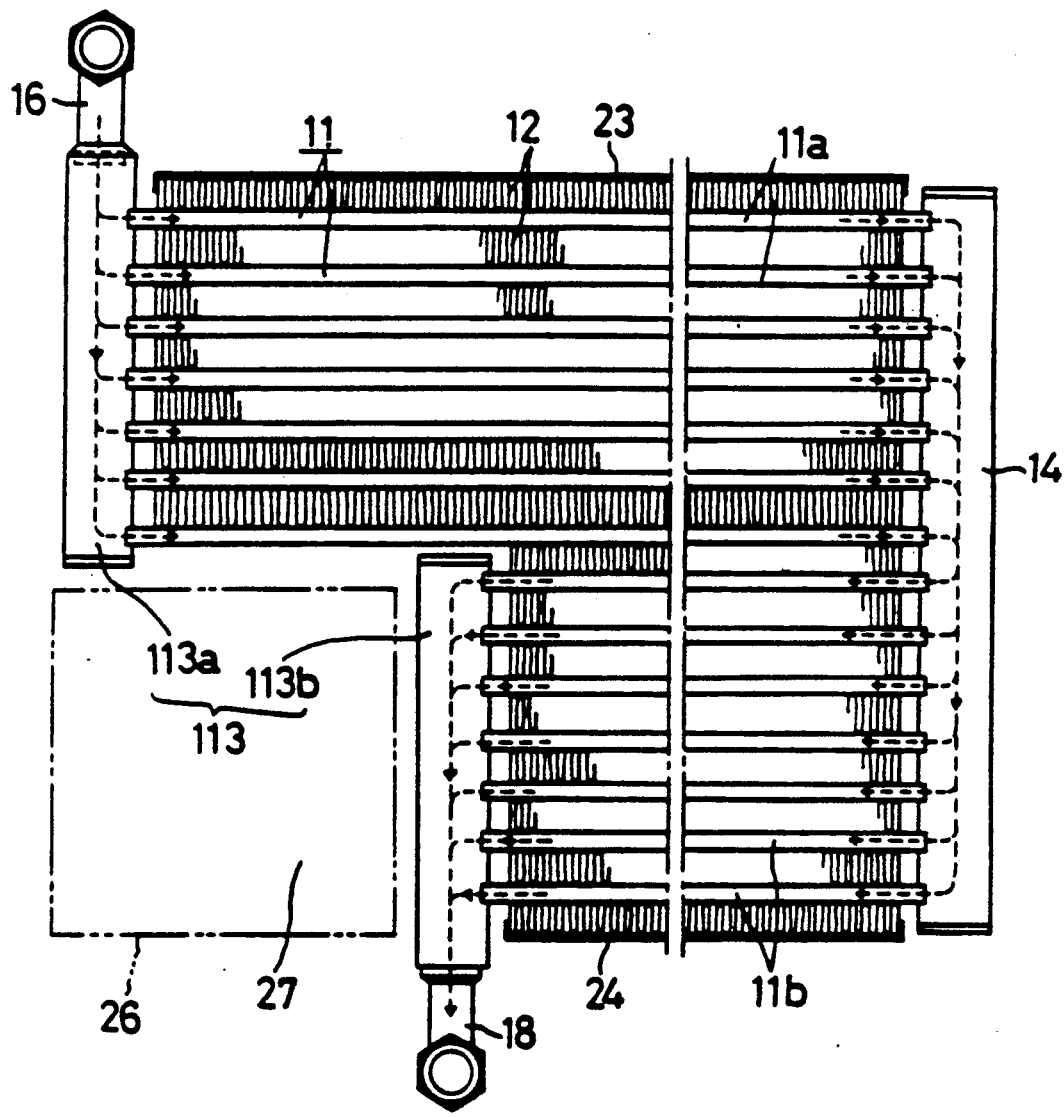
FIG. 14 is front view showing a modified version of the condenser.

FIG. 14 shows an example of the condenser embodying the present invention, characterized in that the condenser is provided with a space 27 void of any tube or fin so that an obstacle 26 is avoided when it is installed in an engine or compartment elsewhere. This embodiment has a pair of headers 113 and 14, and the left-hand header 113 is divided into two parts 113a and 113b. The tubes 11 consist of longer tubes 11a and shorter tubes 11b, which are connected to the header 113b at their left-hand ends. The other ends thereof are connected to the header 14. The outlet pipe 18 is provided on the header 113b. The coolant introduced through the inlet pipe 16 flows in the direction of arrows up to the right-hand header 14, and makes a U-turn to flow through the shorter tubes 11b up to the header 113b, where it is let out through the outlet pipe 18. The number of the space 27 is determined in accordance with that of an abstacle 26; when three spaces are to be given, three kinds of lengths of tubes are used.

What is claimed is:

1. A condensing apparatus comprising:

a pair of headers provided in parallel with each other;

a plurality of tubular elements whose opposite ends are connected to the headers;

fins provided in air paths present between one tube and the next;

wherein each header is made of an aluminum pipe having a circular cross-section;

wherein each of the tubular elements is made of a flat hollow aluminum tube; and wherein the opposite ends of the tubular elements are inserted in slits produced to the headers, and liquid-tightly secured therein;

wherein at least one of the headers is internally divided by a partition into at least two groups of coolant passageways, thereby enabling the flow of coolant to make at least one U-turn in the header; and wherein the partition is inserted in the header through a slit produced in the header and secured therein.

* * * * *

REEXAMINATION CERTIFICATE (3002th)

United States Patent [19]
Hoshino et al.

[11] B1 5,025,855
[45] Certificate Issued * Sep. 24, 1996

[54] CONDENSER FOR USE IN A CAR COOLING SYSTEM

[75] Inventors: Ryoichi Hoshino; Hironaka Sasaki; Takayuki Yasutake, all of Oyamashi, Japan

[73] Assignee: Showa Aluminum Corporation, Osaka, Japan

Reexamination Request:
No. 90/003,822, May 8, 1995

Reexamination Certificate for:
Patent No.: 5,025,855
Issued: Jun. 25, 1991
Appl. No.: 509,901
Filed: Apr. 16, 1990

[*] Notice: The portion of the term of this patent subsequent to May 2, 2006, has been disclaimed.

Related U.S. Application Data

[62] Division of Ser. No. 328,896, Mar. 27, 1989, Pat. No. 4,936,379, which is a division of Ser. No. 77,815, Jul. 27, 1987, Pat. No. 4,825,941.

[30] Foreign Application Priority Data

Jul. 29, 1986 [JP] Japan .................................. 61-179263
Nov. 2, 1986 [JP] Japan .................................. 61-263138

[51] Int. Cl.⁶ .................................................. F28D 1/00
[52] U.S. Cl. ........................ 165/150; 165/110; 165/153; 165/174
[58] Field of Search ....................... 165/110, 150, 165/153, 146, 174, 176

[56] References Cited

U.S. PATENT DOCUMENTS

| | | |
|---|---|---|
| 131,779 | 10/1872 | Pitts et al. . |
| 1,078,271 | 11/1913 | Force et al. . |
| 1,958,226 | 5/1934 | Askin . |
| 2,004,390 | 6/1935 | Benzinger . |
| 2,200,788 | 5/1940 | Coy . |
| 2,310,234 | 2/1943 | Haug . |
| 2,573,161 | 10/1951 | Tadewald . |
| 2,867,416 | 1/1959 | Lieberherr . |
| 3,307,622 | 3/1967 | Oddy . |
| 3,310,869 | 3/1967 | LePorte et al. . |
| 3,416,600 | 12/1968 | Fink . |
| 3,524,500 | 8/1970 | Benjumeda et al. . |
| 3,675,710 | 7/1972 | Ristow . |
| 3,689,972 | 9/1972 | Mosier et al. . |
| 3,759,321 | 9/1973 | Ares . |
| 3,860,038 | 1/1975 | Forni . |
| 4,141,409 | 2/1979 | Woodhull, Jr. et al. . |
| 4,201,263 | 5/1980 | Anderson . |
| 4,209,059 | 6/1980 | Anthony et al. . |
| 4,330,034 | 5/1982 | Lang et al. . |
| 4,332,293 | 6/1982 | Hiramatsu . |
| 4,569,390 | 2/1986 | Knowlton et al. . |
| 4,570,700 | 2/1986 | Ohara et al. . |
| 4,615,385 | 10/1986 | Saperstein et al. . |
| 4,688,311 | 8/1987 | Saperstein . |
| 4,766,953 | 8/1988 | Grieb et al. . |
| 4,825,941 | 5/1989 | Hoshino et al. . |
| 4,998,580 | 3/1991 | Guntly et al. . |

FOREIGN PATENT DOCUMENTS

| | | |
|---|---|---|
| 65546 | 8/1947 | Denmark . |
| 0002687 | 12/1978 | European Pat. Off. . |

(List continued on next page.)

*Primary Examiner*—Allen J. Flanigan

[57] ABSTRACT

A condenser apparatus includes a pair of headers provided in parallel with each other; a plurality of tubular elements whose opposite ends are connected to the headers; and fins provided in the air paths between one tube and the next. Each of the headers is made of a cylindrical pipe of aluminum. At least one of the headers is internally divided by a partition into at least two groups of coolant passageways, thus enabling the flow of coolant to make at least one U-turn in the header. The partition extends into the header through a slit in the header. Each of the tubular elements is made of a flat hollow tube of aluminum. The opposite ends of the tubular elements are inserted into slits produced in the headers so that they are liquid-tightly secured.

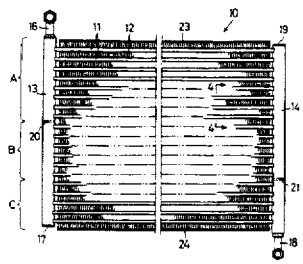

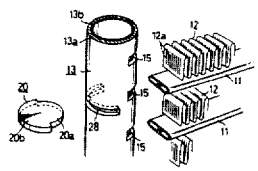

FOREIGN PATENT DOCUMENTS

| Number | Date | Country |
|---|---|---|
| 0138435 | 9/1984 | European Pat. Off. . |
| 0219974 | 9/1986 | European Pat. Off. . |
| 0255313 | 2/1987 | European Pat. Off. . |
| 1265756 | 8/1960 | France . |
| 1431920 | 2/1966 | France . |
| 2287963 | 5/1976 | France . |
| 2367996 | 5/1978 | France . |
| 2390694 | 12/1978 | France . |
| 2574175 | 6/1986 | France . |
| 2129965 | 12/1971 | Germany . |
| 2025207 | 12/1971 | Germany . |
| 2238858 | 8/1972 | Germany . |
| 2603968 | 8/1977 | Germany . |
| 3005751 | 2/1980 | Germany . |
| 3206298 | 10/1982 | Germany . |
| 3423746 | 1/1986 | Germany . |
| 3536325 | 5/1986 | Germany . |
| 48-49054 | 7/1973 | Japan . |
| 48-100746 | 12/1973 | Japan . |
| 49-114145 | 10/1974 | Japan . |
| 54-17158 | 2/1979 | Japan . |
| 55-10072 | 1/1980 | Japan . |
| 55-72795 | 5/1980 | Japan . |
| 55-100963 | 7/1980 | Japan . |
| 56-149295 | 11/1981 | Japan . |
| 57-38169 | 3/1982 | Japan . |
| 57-66389 | 4/1982 | Japan . |
| 57-87576 | 6/1982 | Japan . |
| 57-198992 | 12/1982 | Japan . |
| 58-221390 | 12/1983 | Japan . |
| 59-19880 | 6/1984 | Japan . |
| 59-37564 | 10/1984 | Japan . |
| 59-173693 | 10/1984 | Japan . |
| 59-181997 | 12/1984 | Japan . |
| 60-91977 | 6/1985 | Japan . |
| 60-101483 | 6/1985 | Japan . |
| 60-191858 | 12/1985 | Japan . |
| 61-93387 | 5/1986 | Japan . |
| 61-114094 | 5/1986 | Japan . |
| 1601954 | 11/1981 | United Kingdom . |
| 2090652A | 7/1982 | United Kingdom . |
| 2167850 | 6/1986 | United Kingdom . |
| WO84/01208 | 3/1984 | WIPO . |

B1 5,025,855

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

1. A condensing apparatus comprising:
a pair of headers provided in parallel with each other;
a plurality of tubular elements whose opposite ends are connected to the headers;
fins provided in air paths present between one tube and the next;
wherein each header is made of an aluminum pipe having a circular cross-section;
wherein each of the tubular elements is made of a flat hollow aluminum tube; and
wherein the opposite ends of the tubular elements are inserted in slits produced to the headers, and liquid-tightly secured therein;
wherein at least one of the headers is internally divided by a partition into at least two groups of coolant passageways, thereby enabling the flow of coolant to make at least one U-turn in the header; and
wherein the partition is inserted in the header through a slit produced in the header and secured therein, *the portion of the partition disposed in the header being without any perforations.*

* * * * *